June 15, 1926.
E. G. K. ANDERSON
LENS MOUNTING FOR LAMP CASES
Filed Oct. 29, 1921
1,588,436
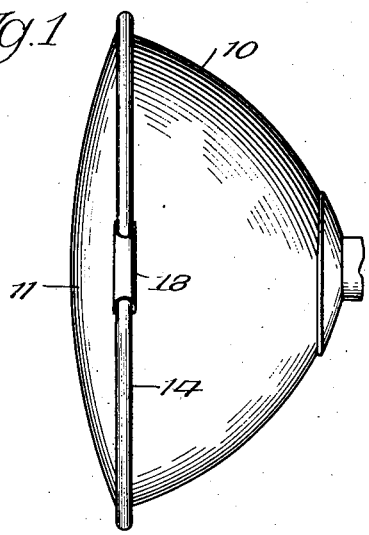
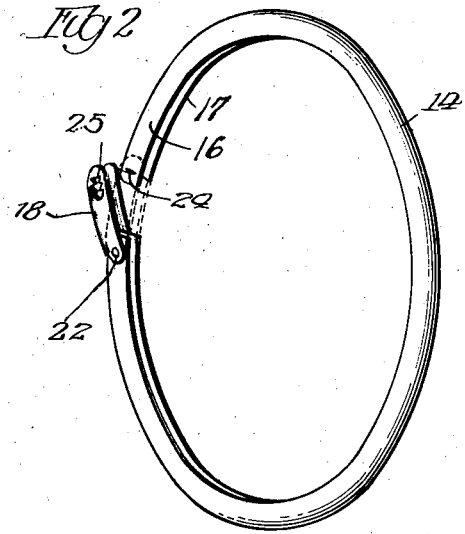
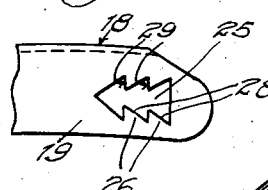
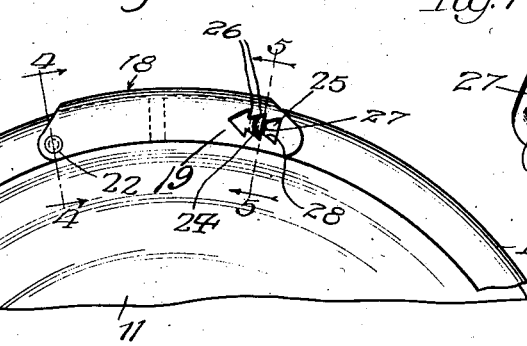
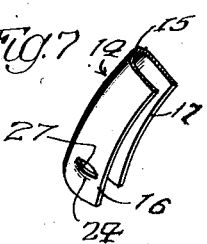
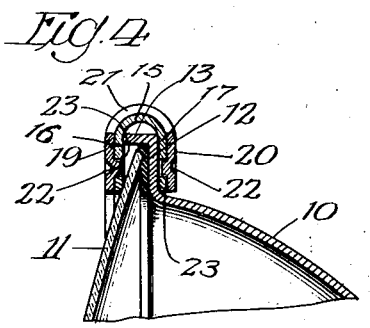
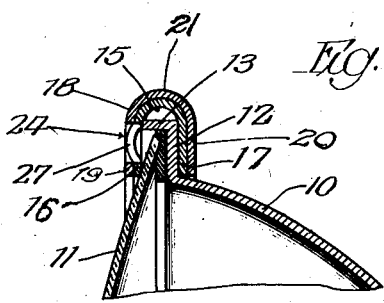
Inventor
ERNST G. K. ANDERSON
By William L. Hall, Atty.

Patented June 15, 1926.

1,588,436

UNITED STATES PATENT OFFICE.

ERNST G. K. ANDERSON, OF EVANSTON, ILLINOIS, ASSIGNOR, BY MESNE ASSIGNMENTS, TO APPLETON ELECTRIC CO., OF CHICAGO, ILLINOIS, A CORPORATION OF ILLINOIS.

LENS MOUNTING FOR LAMP CASES.

Application filed October 29, 1921. Serial No. 511,481.

This invention relates to a novel means for removably connecting together two members along circular overlying margins and for supporting one of the members from the other member by such connection, while permitting the supported member to be quickly removed from the member which supports it. The invention is herein shown as adapted for connecting the lens of a vehicle head or spot lamp to the lamp casing and for supporting said lens over the open side of the casing. It comprises an open ring of suitable cross section to embrace the overlying margins of the lens and the forward marginal portion of the casing at the front open side thereof, together with means for drawing the ends of the open ring together to press and hold the margin of the lens against its seat at the marginal portion of the casing. The invention may be applied to thus connect and support other members that meet in like marginal relation, as, for instance, for connecting and supporting a mirror glass on a backing or frame.

Among the objects of the invention is to provide a novel mounting and supporting ring-like frame for thus holding and supporting two members which overlie and are seated one upon the other at their margins, so constructed and arranged as to press or hold the supported member on the supporting member by means which produce a reliable seating connection between the parts without exerting stress tending to fracture the supported part when made of glass, and to provide a novel means for adjustably holding together the mounting ring to adapt it to closely hold and connect together members of different thicknesses.

Further objects of the invention are to provide a novel clasp for connecting the ends of the open mounting ring, which is simple and inexpensive in construction, which closes the joint between the ends of the ring when the ring is closed and locked on the overlapping members, which occupies but little space on the mounting ring and, therefore, obviates projecting parts, and to provide novel means of hingedly connecting the clasp to one end of the open ring and for interlockingly connecting it to the other end of said ring in a manner to adjustably close it on the overlapping margins of the parts to be joined together and supported one on the other.

The invention consists in the combination and arrangement of the parts shown in the drawings and described in the specification, and is particularly pointed out in the appended claims.

As shown in the drawings:

Figure 1 is a side elevation of a lamp casing and its lens, showing my invention applied thereto to lock the lens to the lamp casing.

Figure 2 is a perspective view of the open ring and its closing clasp or member.

Figure 3 is an enlarged partial front elevation of the lamp casing, showing the mounting ring locked in place.

Figures 4 and 5 are enlarged sectional details on the respective lines 4—4 and 5—5 of Figure 3.

Figure 6 is an enlarged perspective view of the ring closing clasp.

Figure 7 is an enlarged perspective of the locking projection on one end of the ring.

As shown in the drawings, 10 designates a lamp casing of known form in respect of its general contour, and 11 designates the usual lens. Said casing is provided at its open front with a radial, annular, outstanding flange 12 to form a seat for the margin of the lens, and said flange terminates in a cylindric, forwardly directed flange 13 to center the lens. Between said seat and lens is interposed the usual compressible packing of any suitable character.

14 designates an open ring which surrounds the lens and the open side of the casing at the margins thereof and embraces the latter in a manner to press or hold the lens firmly against its seat. The said ring 14 is of general channel shape in cross section and is made of a resilient or spring-like material. It comprises a central web portion 15, preferably rounded, and front and rear radial flange members 16, 17, respectively, the former of which bears against the back of the casing flange 12 and the latter of which bears against the crown lens inwardly beyond its margin. The transverse dimensions of the channel section of the ring is such that when the ring is closed or drawn together in the manner hereinafter described, the resiliency or spring-like action of the flanges thereof serve to press the lens firmly against the packing that lies between it and the seat on the lamp casing.

The present invention relates to a ring of this character and to a connecting means, in the nature of a clasp 18, for connecting the ends of the open ring and for drawing said ends together to cause the ring to yieldingly embrace the marginal parts of the frame and lens, and relates also to means for hinging the clasp member to one end of the open ring and for interlockingly and detachably connecting it to the other end of said ring in a manner to adjustably draw or close the ring about the marginal parts of the lens and casing.

Said clasp is made of the same general cross section as the open ring 14 and sufficiently larger to fit over the adjacent ends of the open ring. It comprises front and rear flanges 19, 20, respectively, and a connecting or closed portion 21 of a shape to fit over and conform to the connecting or closed portion 15 of the ring. Said clasp is hinged to one end of said open ring to swing towards and from the other end thereof, as indicated in full and dotted lines in Figure 2. The hinge connection between said clasp and one end of said open ring is formed by means of lugs 22, 22 on the flanges 19 and 20 of the clasp which are pressed or swaged toward each other to constitute pintles which engage bearing openings 23, 23 that are punched in the flanges 16 and 17 of the open ring near one end thereof, as best shown in Figures 3 and 4.

The free end of the clasp and the other end of the open ring are provided with interfitting socket and projecting means which are adapted for interlocking connection to close or hold the ring about the overlying margins of the lens and casing. The said locking means, as herein shown, comprise a spur 24, which is formed or struck outwardly from one of the flanges of the open ring and an elongated socket or opening 25 in the corresponding wall of said clasp, the margins of which are provided with opposing, inwardly directed teeth 26 for locking engagement with said spur. The said spur or projection 24 is formed by punching the metal of the flange 16 along a curved, transverse line thereof and thereafter forcing or swaging the metal outwardly to produce a square, cut, out-raised, rearwardly facing shoulder 27 which forms a locking shoulder. Said spur or projection is transversely rounded and is also rounded in the part thereof which remains integral with the flange from which it is formed, as indicated in Figures 5 and 7.

The locking teeth 26 at the sides of the elongated opening 25 terminate short of each other, and said teeth are disposed in opposing transverse pairs. Each tooth has a forwardly facing, rearwardly inclined edge 28 and a square or abrupt, rearwardly facing edge 29, and said abrupt edges of the teeth of each pair are in line with each other transversely of said opening to constitute spaced shoulders to engage the shouldered edge 27 of the locking spur 24, the said shouldered edge of the spur bridging between the spaced shoulders of a pair of said teeth for interlocking engagement therewith. A number of pairs of teeth, spaced longitudinally of the opening 25, is employed for separate engagement with said spur, so as to thereby adapt the ring to lenses and casings of different thicknesses. The resilience of the clasp flange bearing said teeth is such as to permit the locking spur to pass inside said flange when the ring is in place and the clasp is swung down over the ends of the open ring. In this way the spur is in position to engage one or another of the pairs of teeth of the clasp when the latter is in its locking position until the spur reaches and engages a pair of teeth with which it cooperates to tightly lock the ring over the overlying marginal parts of the lens and casing. Thus the ring can be adapted to lamp casings and lenses differing substantially in thickness.

The resilience or springiness of the open ring, when the clasp is released, enables said ring to be opened to fit it over the overlying marginal parts of the casing and lens. Thereafter the clasp is swung down over the end of the open ring which carries said spur and the lateral convexity of said spur, by engagement with the tooth bearing flange of the clasp, causes the latter flange to be sprung outwardly to permit it to pass over the spur and to bring the spur in register with the oblong opening 25. Thereafter the ends of the open ring can be drawn together by grasping the ring on both sides of the clasp until the locking spur is engaged with the locking shoulders or edges of the pair of teeth which are adapted to hold the ring properly closed. The closing of the open ring has the effect to decrease its diameter and to force the margin of its outer flange against the lens in a manner to press the lens margin closely against its seat on the casing flange.

When the locking ring is to be removed for the purpose of removing or replacing a lens, the ring is grasped at both sides of the clasp to force the ends of the ring towards each other sufficiently to release the edge of the spur from the teeth then engaged by it, whereupon the clasp may be swung outwardly about its hinge and thus disconnect the ends of the open ring. The outer convex face of the spur facilitates the swinging release movement of the clasp, inasmuch as engagement therewith by the tooth bearing flange springs said flange outwardly sufficiently to allow the flange to slide past said spur. The closed side of the clasp at its hinged end is obliquely cut away to permit swinging movement of the clasp sufficiently to release its free end from the ring, and, for the purpose of symmetry, the like part of the free end of the clasp will preferably be likewise cut away.

It will be observed that the clasp, when in its locking position, overlies and closes the joint between the ends of the open ring, thus producing a weather-proof joint at this point. It will also be noticed that the clasp cooperates with the channel ends of the ring to reinforce and strengthen the joint, and that the gauge of the clasp is such that said clasp, when closed down over the ends of the open ring, affords a very neat finish and presents no projections beyond the ring, such as would entangle a wiping cloth or such as would give an unsightly contour to the lens locking ring.

I claim:

1. An open resilient ring adapted to encircle, and radially inwardly flanged to embrace, the margins of two marginally overlying parts to hold them one on the other, and a clasp having a radial flange and hinged at its flange to the radial flange at one end of said ring and adapted to close over and embrace at its flange the flange of the other end of said ring, said clasp and the latter end of the ring being provided at corresponding side overlying flanges, radially inwardly beyond the circumferential periphery of the ring with detachable interlocking members to lock said ring closed at said overlying parts, said interlocking members comprising a spur on the ring flange and a plurality of openings in the clasp flange.

2. An open resilient ring of channel cross section, and a clasp also of channel cross section hinged to one end of said ring and adapted to close on and embrace the other end thereof, one flange of said open ring near one end thereof being formed with a locking spur and the corresponding overlying flange of the clasp being formed with a series of spaced cooperating locking shoulders adapted for detachable and separate locking engagement with said spur.

3. An open resilient ring of channel cross section to encircle and embrace the margins of two marginal, radially overlying parts, and a channel cross section clasp adapted to embrace the flanges of both ends of said ring with the central body of the clasp lying substantially flush with the ring ends, the flanges of said clasp lying exterior to and against the flanges of the ring and radially inwardly beyond the circumference of said ring, interlocking connections between overlying flanges of the clasp and ring, and a hinge connection between the clasp and the other end of the ring embracing mutually interbearing projections and sockets, located radially inwardly beyond the circumference of the ring.

4. The combination with the two ends of an open ring of channel cross section, of a clasp of like cross section with its side flanges adapted to lie exterior to the side flanges of the ring on both sides of the opening in the ring, both said flanges at one end of the clasp being provided with integral, inwardly formed hinge projections to engage bearing openings in the corresponding flanges of the ring, and one of the flanges at the other end of the clasp and the corresponding ring flange being formed with mutually interlocking projections.

5. An open resilient ring of channel cross section to encircle and embrace the margins of two marginally overlying parts, and a channel cross section clasp adapted to embrace both ends of said ring, with its flange lying exterior to the flanges of the ring, means at one end of the clasp to hinge said clasp to one end of the open ring, the other end of said ring being formed with a locking spur and the free end of the clasp being formed with an elongated opening having at its sides teeth arranged in opposing pairs and the spur being adapted to bridge separately between and to interlock with the teeth of said pairs.

In witness whereof I claim the foregoing as my invention, I hereunto append my signature this 22 day of October, 1921.

ERNST G. K. ANDERSON.